(12) United States Patent
Kanenari et al.

(10) Patent No.: US 6,431,236 B1
(45) Date of Patent: Aug. 13, 2002

(54) PNEUMATIC TIRE USING LONG AFTERGLOW PHOSPHORESCENT RUBBER COMPOSITION

(75) Inventors: Daisuke Kanenari; Hiroyuki Kaido, both of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/413,342

(22) Filed: Oct. 12, 1999

(30) Foreign Application Priority Data

Oct. 12, 1998 (JP) .......................................... 10-289685
Mar. 24, 1999 (JP) ............................................ 11-79618

(51) Int. Cl.$^7$ .................................................. B60C 5/00
(52) U.S. Cl. ........................ 152/450; 152/525; 152/524
(58) Field of Search ................................ 152/525, 524, 152/450; 156/116

(56) References Cited

U.S. PATENT DOCUMENTS 3,607,498 A * 9/1971 Kubota ........................ 156/116
5,280,083 A * 1/1994 Forste et al. ................. 525/369
6,093,271 A * 7/2000 Majumdar ................... 156/116

FOREIGN PATENT DOCUMENTS

| JP | 50-156561 | 12/1975 |
|----|-----------|---------|
| JP | 52-85203 | 6/1977 |
| JP | 59020703 | 2/1984 |
| JP | 61-73405 | 5/1986 |
| JP | 61-93303 | 6/1986 |
| JP | 04202339 | 7/1992 |
| JP | 7-37713 | 7/1995 |

* cited by examiner

Primary Examiner—Edward J. Cain
Assistant Examiner—Katarzyna W Lee
(74) Attorney, Agent, or Firm—Arent Fox Kintner Plotkin & Kahn

(57) ABSTRACT

A pneumatic tire having a non-black rubber composition provided at the at least one portion thereof, at least a portion of said non-black rubber composition comprising 100 part by weight of at least one synthetic rubber and 5 to 100 parts by weight of strontium aluminate or calcium aluminate a long afterglow phosphorescent substance having an average particle size of 1 to 100 Am and having no substantial amounts of carbon black and staining antioxidant, and crosslinked with a crosslinking agent other than sulfur or a pneumatic tire having two or more layer structure of a surface layer of the above phosphorescent rubber composition layer and a lower layer of a blight-colored reflecting layer or the transparent or translucent cover layer and the under phosphorescent rubber composition layer.

11 Claims, 3 Drawing Sheets

PNEUMATIC TIRE USING LONG AFTERGLOW PHOSPHORESCENT RUBBER COMPOSITION

BACKGROUND OF THE INVENTION

1. Field of the Invention

The present invention relates to a pneumatic tire using a long afterglow phosphorescent (i.e., "phosphorescent" hereinbelow) rubber composition. More specifically, it relates to a pneumatic tire using a phosphorescent rubber composition in at least a portion of the tire for the purpose of providing the visibility thereof at night or at a dark place and also providing the ornamental design effect to the tire.

2. Description of the Related Art

Many Patent and Utility Model Applications relating to tires using a phosphorescent substance at the side portion thereof, especially the white side ribbon and side letter portions, are published and known in the art (e.g., Japanese Utility Model Publication Nos. 50-156561, 52-85203, 61-73405, 61-93303, and 7-37713 and Japanese Patent Publication Nos. 59-20703 and 4-202339), for the purposes of improving the visibility of tires at night and producing fashionability of tires.

However, when the phosphorescent substance (e.g., a long afterglow phosphorescent pigment) is intended to apply to, for example, the tire side portions by adhering a seal or wappen thereto, they are not able to follow the deformation due to the rolling of the tire, and therefore, the seal or wappen is peeled off or the cracks occur in the coating. Furthermore, although a method for blending the phosphorescent agent into the tire member rubber is disclosed, the tire member rubber contains many ingredients such as carbon black and therefore, the phosphorescent agent cannot be seen at all. In addition, even in the case of white-colored compounding, the phosphorescent agent is masked or hidden by a large amount of titanium dioxide compounded therein and its luminance is much weakened by heavy metals contained in the sulfur.

Furthermore, conventional tires with white side ribbons and side letter generally have black non-contaminating layers located at the uppermost surfaces thereof, followed buffing the non-contaminating layers after vulcanization to expose the white rubber. In this case, since the portion of the light accumulating rubber layer should be shaved to some extent, the phosphorescent layer should be in such a thickness that the substrate layer does not exposed after shaving so that there are problems in the increase of the amount of the rather expensive phosphorescent substances to be used.

SUMMARY OF INVENTION

Accordingly, the objects of the present invention are to obviate the above-mentioned problems in the prior art and to provide a pneumatic tire having the improved visibility and the improved ornamental design effects during running at night, without impairing the luminance due to the coloring after the vulcanization and the influence of heavy metals in the sulfur, by using the specified phosphorescent substance and by the non-sulfur vulcanization without compounding carbon black.

Other objects of the present invention are to improve the luminance by providing a reflecting layer under the phosphorescent rubber layer, to decrease the amount of the phosphorescent substance to be used by providing a transparent or translucent cover layer above the phosphorescent rubber layer to be able to design the thickness of the phosphorescent rubber layer thin, and to protect the phosphorescent substance which are not strong against moisture by a cover layer.

In accordance with the present invention, there is provided a pneumatic tire having a non-black rubber portion such as side ribbon, side letter, applique provided at the at least one portion thereof, at least a portion of said non-black rubber composition comprising 100 part by weight of at least one synthetic rubber and 5 to 100 parts by weight of strontium aluminate or calcium aluminate a long afterglow phosphorescent (i.e., "phosphorescent" hereinbelow) substance having an average particle size of 1 to 100 μm and having no substantial amounts of carbon black and staining antioxidant, and crosslinked with a crosslinking agent other than sulfur.

In accordance with the present invention, there is also provided a pneumatic tire having at least two layer structures of (i) a surface layer composed of a phosphorescent rubber composition layer and (ii) a lower layer of a bright-colored reflecting rubber layer.

In accordance with the present invention, there is further provided a pneumatic tire comprising phosphorescent rubber composition layer a transparent or translucent cover layer located as the upper layer of the phosphorescent rubber composition layer on at least portion of the non-black rubber.

In accordance with the present invention, there is further provided a pneumatic tire comprising the non-black rubber composed of the three layer structure of, in the order from the outer surface of the tire, a transparent or translucent cover layer, a phosphorescent rubber composition layer and a bright-colored reflecting rubber layer.

In accordance with the present invention, there are further provided a pneumatic tire wherein at least the phosphorescent rubber composition of the non-black rubber contains an isobutylene rubber, a pneumatic tire wherein the transparent or translucent cover layer is composed of such a rubber composition, thermoplastic resin or thermoplastic elastomer that the light transmittance of 1 mm thick film is 50% or more, and a pneumatic tire wherein a part of the transparent or translucent cover layer is removed after the vulcanization of the tire.

BRIEF DESCRIPTION OF THE DRAWINGS

The present invention will be better understood from the description set forth below with reference to the accompanying drawings, in which:

In FIGS. 1–3, 2, 5, and 8 represent a cap tread and 3, 6 and 9 represent a black side portion.

DESCRIPTION OF THE PREFERRED EMBODIMENTS

Figure 1:
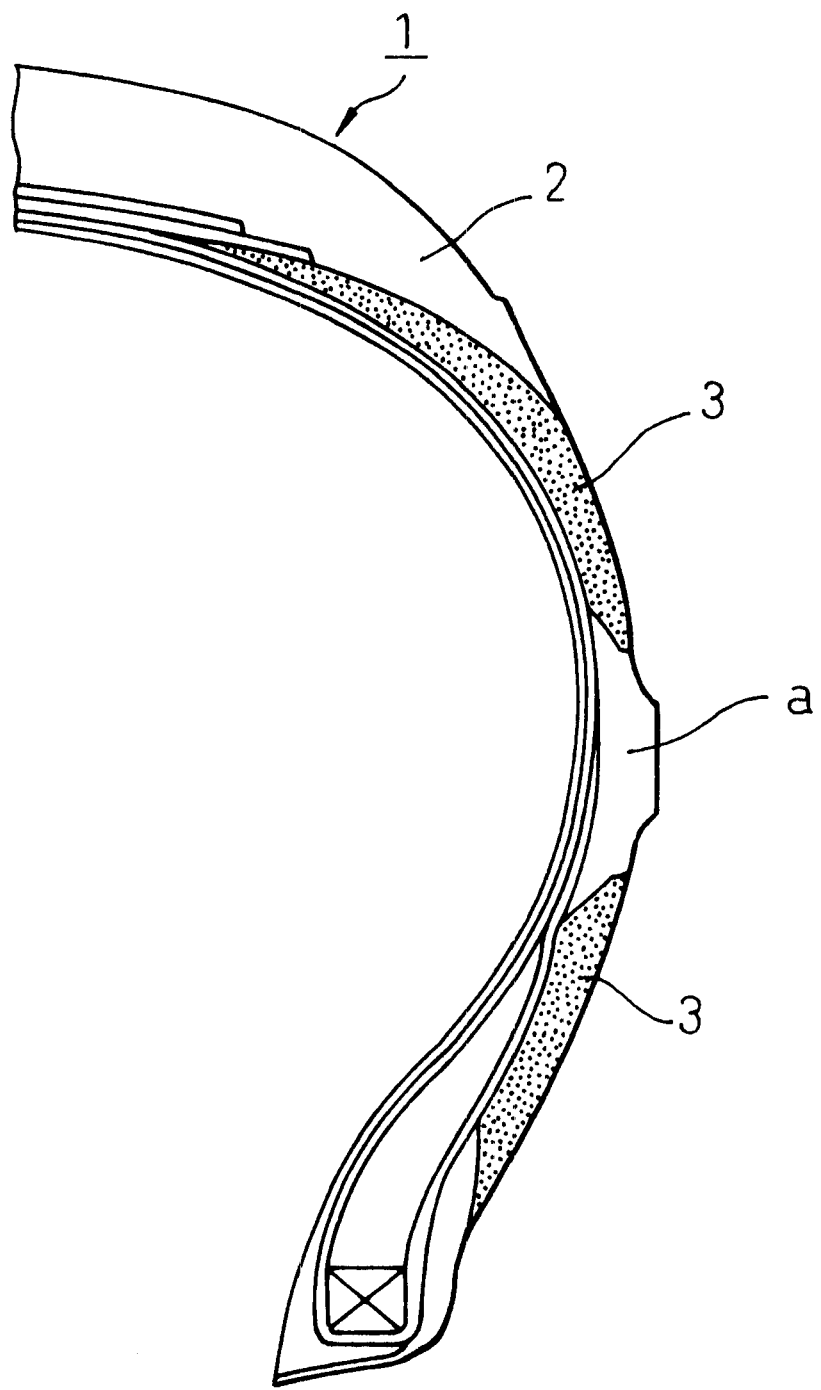
FIG. 1 is a partial sectional view in the meridian direction of a pneumatic tire according to the present invention wherein a single phosphorescent rubber layer a is provided at a side ribbon portion 1 thereof.

The present invention is characterized by forming a white side ribbon, side letter, applique, etc (i.e, "non-black rubber"

hereinafter) used as a part of a pneumatic tire with a rubber composition comprising 100 part by weight of at least one synthetic rubber and 5 to 100 parts by weight of strontium aluminate or calcium aluminate phosphorescent substance having an average particle size of 1 to 100 $\mu$m and having no substantial amounts of carbon black and containing a staining antioxidant, and crosslinked with a crosslinking agent other than the crosslinking system (i.e., sulfur) of the surrounding tire member rubber.

As explained above, according to the present invention, since the carbon black is not compounded for the non-black rubber and non-sulfur vulcanization is carried out, the light transmittance to the phosphorescent substance can be secured due to the non-compounding of carbon black and the discoloration of rubber to yellow due to the presence of sulfur and the decay of luminescence due to the heavy metals contained in the sulfur can be avoided or solved by the non-sulfur vulcanization. In addition, since the non-black rubber having a high emission luminance can be obtained, together with the use of the specific phosphorescent substance having an excellent luminance, according to the present invention, a tire capable of highly increasing the visibility during running at night by strong luminance and fashionability can be obtained.

The synthetic rubber usable as a basic material of the non-black rubber of a tire according to the present invention may be any synthetic rubber base generally used. Preferable examples thereof are diene rubbers and the hydrogenated products thereof (e.g., polyisoprene rubber (IR), polybutadiene rubber (BR), conjugated diene-aromatic vinyl copolymers (e.g., SBR), nitrile-conjugated diene copolymers (e.g., NBR), hydrogenated NBR, hydrogenated SBR), olefin rubbers (e.g., ethylene-propylene rubber (EPDM or EPM), maleic acid-modified ethylene-propylene rubber (M-EPM), butyl rubber (IIR), copolymers of isobutylene and aromatic vinyl or diene monomer), acryl rubber (ACM), ionomer, halogenated rubber (e.g., Cl-IIR, Br-IIR, brominated product of isobutylene-p-methylstyrene copolymer (Br-IPMS), chloroprene rubber (CR), hydrin rubber (CHR, CHC, chlorosulfonated polyethylene (CSM), chlorinated polyethylene (CM), maleic acid modified chlorinated polyethylene (M-CM)), sulfur-containing rubber (e.g., polysulfide rubber), fluorine rubber (e.g., vinylidine fluoride rubber, fluorine-containing vinyl ether rubber, tetrafluoroethylene-propylene rubber, fluorine-containing phosphazene rubber), etc. These rubbers may be used alone or in any mixtures thereof.

The above rubbers can be crosslinked with any crosslinking agents, other than sulfur, provided that those crosslinking agents do not cause remarkable discoloration after crosslinking and do not contain having metals impairing the luminance of the phosphorescent substance. Examples of such crosslinking agents are organic peroxides, metal oxides (e.g., zinc oxide, magnesium oxide, etc.), metal peroxides, quinone dioxim, epoxy resins, chlorine compounds (e.g., trichloromelamine, hexachloropentadiene, trichloromethane sulfochloride, benzotrichloride, etc.), isocyanates and radiation. In addition, the organic compounds capable of releasing sulfur at a vulcanization temperature such as, for example, thiuram disulfide, thiuram tetrasulfide, morpholine derivatives forms the crosslinking with the sulfur atom. However, since these organic compounds do not contain heavy metals impairing the luminance of the phosphorescent substance, those organic compounds are within the categories of the crosslinking agent according to the present invention. Generally speaking, the organic peroxides are generally preferable in the case of diene rubbers for tire use.

As the organic peroxide compounds usable in the crosslinking of the rubber materials for the non-black rubber in the present invention, any organic compounds generally used for the peroxide vulcanization of rubber may be mentioned. Typical examples of such organic peroxides are dicumylperoxide, di-t-butylperoxide, t-butylcumylperoxide, benzoylperoxide, 2,5-dimethyl-2,5-di(t-butylperoxy)hexine-3, 2,5-dimethyl-2,5-di-(benzoylperoxy)hexane, 2,5-dimethyl-2,5-mono(t-butylperoxy)hexane, $\alpha,\alpha'$-bis(t-butylperoxy-m-isopropyl)benzene. These organic peroxides may be used alone or any mixtures thereof in an amount of, preferably, 0.2 to 10 parts by weight, more preferably, 0.2 to 6 parts by weight, based upon 100 parts by weight of the base rubber.

The present invention is characterized by compounding 100 parts by weight of the synthetic rubber of the non-black rubber portion with 5–100 parts by weight of the phosphorescent substance having an average particle size of 1–100 $\mu$m, which is preferably at least one compound selected from the group consisting of strontium aluminate or calcium aluminate light accumulating phosphorescent substance such as, for example, $SrAl_2O_4$:Eu, Dy, $Sr_4Al_{14}O_{25}$:Eu, Dy, $CaAl_2O_4$:Eu, Nd, $SrAl_2O_4$:Eu and $m(Sr_{1-x}Eu_x)$ $O \cdot nAl_2O_3 \cdot yB_2O_3$ wherein $1 \leq m \leq 5$, $1 \leq n \leq 8$, $0.001 \leq x \, 0.1$, $0.005 \leq y \leq 0.35$), followed by crosslinking with the specified crosslinking agent to obtain the non-black rubber composition of the tire. According to the present invention, it becomes possible to obtain the emission luminance and aftergrow time, which are more than 10 times of the conventional one even in the absence of a radioactive element unlike the prior art, by the use of the above-specified phosphorescent substance, and it also becomes possible to obviate the discoloration after the vulcanization and to surpress the decrease in the luminance of the phosphorescent substances by the crosslinking of the matrix rubber with the crosslinking agent other than sulfur.

The compounding amount of the phosphorescent substance to the base rubber is 5 to 100 parts by weight, based upon 100 parts by weight of the synthetic rubber, which is essential to form the phosphorescent non-black side rubber composition having the desired function and effects of the present invention. When this compounding amount is less than 5 parts by weight, the luminance unpreferably becomes insufficient. Contrary to this, when the compounding amount is more than 100 parts by weight, the improvement effect to the luminance becomes saturated, and therefore, not only the additional portion is wasteful, but also the physical properties of the resultant base rubber composition tends to be decreased. To obtain the desired function and effects, the phosphorescent substance should have an average particle size of 1–100 $\mu$m, preferably 5 to 70 $\mu$m. When the average particle size of less than 1 $\mu$m, the classification becomes difficult and the luminance is decreased. Contrary to this, when the particle size is more than 100 $\mu$m, the physical properties of the base rubber composition become worse.

The non-black rubber composition according to the present invention may optionally contain white fillers such as silica, talc, clay, calcium carbonate, etc., based upon the required properties in an amount generally used in the prior art. From the viewpoint of clarity or transparency, the use of silica is preferable. Furthermore, for the purpose of causing the irregular reflection of the light of the phosphorescent substance, of increasing the emission luminance and of improving the visibility, fillers such as glass powder, quartz powder, acryl resin powder can be compounded in such an extent that the light transmittance is not prevented and the physical properties are not impaired. However, carbon black as a filler is not compounded in the present invention, because the luminance of the phosphorescent substance is remarkably impaired. Furthermore, it is preferable that the heavy metals (e.g. Co, Ni, Pb, Ti, Cd) decreasing the luminance of the phosphorescent substance and highly hygroscopic agents, coloring or staining agents are not used.

The non-black rubber according to the present invention can be a two-layer structure of the surface phosphorescent rubber composition layer and the under reflecting layer rubber colored to white, yellow, yellowish green, light blue or silver. The surface or lower layer used herein means the surface (i.e. first) layer and under (i.e., second) layer in the order from the outside surface of a tire. When the non-black rubber is formed from at least two layers of the surface phosphorescent substance compounding layer and the under bright colored reflecting layer, light is more effectively absorbed into the phosphorescent layer by the presence of the under bright-colored reflecting layer, whereby not only the luminance is improved but also the compounding amount of the phosphorescent substance is capable of being decreased. Furthermore, when the non-black rubber is formed from the two-layer structure, only the surface layer containing the phosphorescent substance is non-sulfur vulcanized and the under reflecting layer may be sulfur vulcanized.

Furthermore, the thickness of the surface phosphorescent rubber composition layer containing the phosphorescent substance is preferably 0.5–3.0 mm. When this thickness is less than 0.5 mm, the luminance is unpreferably changed depending upon the slight difference of the thickness. Contrary to this, when the thickness is more than 3.0 mm, the phosphorescent substance contained in the inside of the layer does not transmit the light therefrom, the luminous is not further improved and therefore the phosphorescent substance is wastefully used.

The non-black rubber of the present invention is preferably formed from at least two-layered structure of the transparent or translucent surface cover layer and the phosphorescent rubber layer. According to this embodiment, we can buff or slice only the black non-stain layer on the surface and the transparent or translucent cover layer is buffed or sliced without cutting the phosphorescent rubber composition. Therefore, the thickness of the phosphorescent rubber composition can be thinner and the amount of the expensive phosphorescent substance can be reduced. More conveniently, when the part of the cover layer is remained as a surface layer, it can protect the phosphorescent substance from water.

In addition, when the non-black rubber of the present invention is formed from a three-layered structure of the transparent or translucent surface cover layer, the phosphorescent rubber composition layer containing the phosphorescent substance compounded therein and the above-mentioned bright-colored reflecting layer, the luminous of the phosphorescent substance can be further improved, in addition to the above-mentioned advantages of the use of the cover layer. Accordingly, this is more preferable embodiment.

The material forming the above transparent or translucent cover layer according to the present invention may include rubber compositions, thermoplastic resins and thermoplastic elastomers, all having a light transmittance of 50% or more, preferably 70% or more. The cover layer may be colorless or slight or pale colored layer. However, pigments, dyes and additives having a strong absorption spectrum of around 250–600 nm are not preferably used.

In the tire having, at a part thereof, the non-black rubber composed of the two-layered structure of the transparent or translucent cover layer and the phosphorescent rubber composition layer or the three-layered structure of the transparent or translucent cover layer, the phosphorescent rubber composition layer, and bright-colored reflecting layer, according to the present invention, a part of the transparent or translucent cover layer can be removed by buffing or slicing the part of the cover layer of the above non-black rubber such that the part of the cover layer is remained. This cover layer is preferably sliced at a thickness of 2 mm or less, preferably 1.5 mm or less, so that the sufficient amount of the light reaches the underlying phosphorescent rubber layer. Since the buffing method roughens the surface of the transparent or translucent cover layer to thereby substantially decrease the transmittance, the method for slicing the surface in a smooth condition is preferable. It is preferably by these methods to secure the transmittance of the cover layer of 50% or more, more preferably 70% or more.

In the tire according to the present invention, the rubber containing the phosphorescent substance has a tendency of poor fatigue resistance, especially when a large amount of the phosphorescent substance is compounded, and therefore, the difference of the hardness (or modulus) between the rubber composition containing the phosphorescent substance and those of the non-black rubber, the black rubber and the clear cover layer is preferably not large. More preferably, the rubber containing the phosphorescent substance is softer than the surrounding rubbers. More specifically, the storage modulus E'(a) of the rubber composition containing the phosphorescent substance and the storage modulus E'(b) of the surrounding rubber has the following relationship:

Preferably, $1.0 \leq E'(b)/E'(a) \leq 4.0$

More preferably $1.1 \leq E'(b)/E'(a) \leq 3.0$

When both the rubber compositions are selected so that the above ratio is satisfied, the strain added to the phosphorescent rubber at the side wall where is dominantly under constant strain, can be minimized and the fatigue resistance of the phosphorescent substance-containing rubber can be remarkably improved.

In the non-black rubber of the tire according to the present invention, the synthetic rubber preferably containing isobutylene rubber, more preferably halogenated isobutylene rubber is suitably compounded at least in the portion of the phosphorescent rubber composition. When the non-black rubber is made by or contains these rubbers, they cannot only omit staining antioxidants from it but also can suppressed the migration of the staining antioxidants from surrounding rubbers because they have low air and steam (or water vapor) permeability. In addition, these rubbers don't be worried to decrease the luminous of the phosphorescent pigment because they can be vulcanized with a metal oxide or quinone dioxime (without sulfur). of course, it is preferable that the non-stain layer is placed between the non-black phosphorescent portion and the surrounding tire members like in the prior art.

EXAMPLES

The present invention will now be further illustrated by, but is by no means limited to, the following Standard Examples, Examples, and Comparative Examples.

The following commercially available products were used as compounding components in each compounding of the Standard Examples, Examples and Comparative Examples.

Isoprene rubber: Nipol IR-2200 (Nippon Zeon Co., Ltd.)

Ethylene propylene rubber: Mitsui EPT 4070 (Mitsui Petrochemical, Inc.)
Brominated butyl rubber: Exxon Bromobutyl 2255 (Nihon Butyl Co.)
Polypropylene: FM 131 (Tokuyama Corp.)
Clay: Suprex Clay (Kentucky Tennessee Clay)
Silica: Nipsil AQ (Nihon Silica Industries)
Titanium dioxide: JRNC (Teika)
Silane coupling agent: Si-69 (Degussa)
Zinc oxide: Zinc Oxide#1 (Seido Chemicals)
Stearic acid: Bead Stearic Acid (NOF Corporation)
Antioxidant: Antage W-400 (Kawaguchi Chemical)
Zinc stearate: Zinc Stearate (NOF Corporation)
Insoluble sulfur: Sanfel (Sanshin Chemical Industries)
Hydrogenated terpene resin: Clearon P-125 (Yasuhara Chemicals)
Vulcanization accelerator: Nocceler NS-F (Ouchi Shinko Chemical Industries)
Peroxide-1: Perkadox 14/40 (Kayaku Akzo)
Peroxide-2: Perkadox 14 (Kayaku Akzo)
ZnS: Cu: GSS (Nemoto & Co., Ltd)
$SrAl_2O_4$: Eu, Dy: Luminova G-300F (Nemoto & Co., Ltd)

Figure 2:
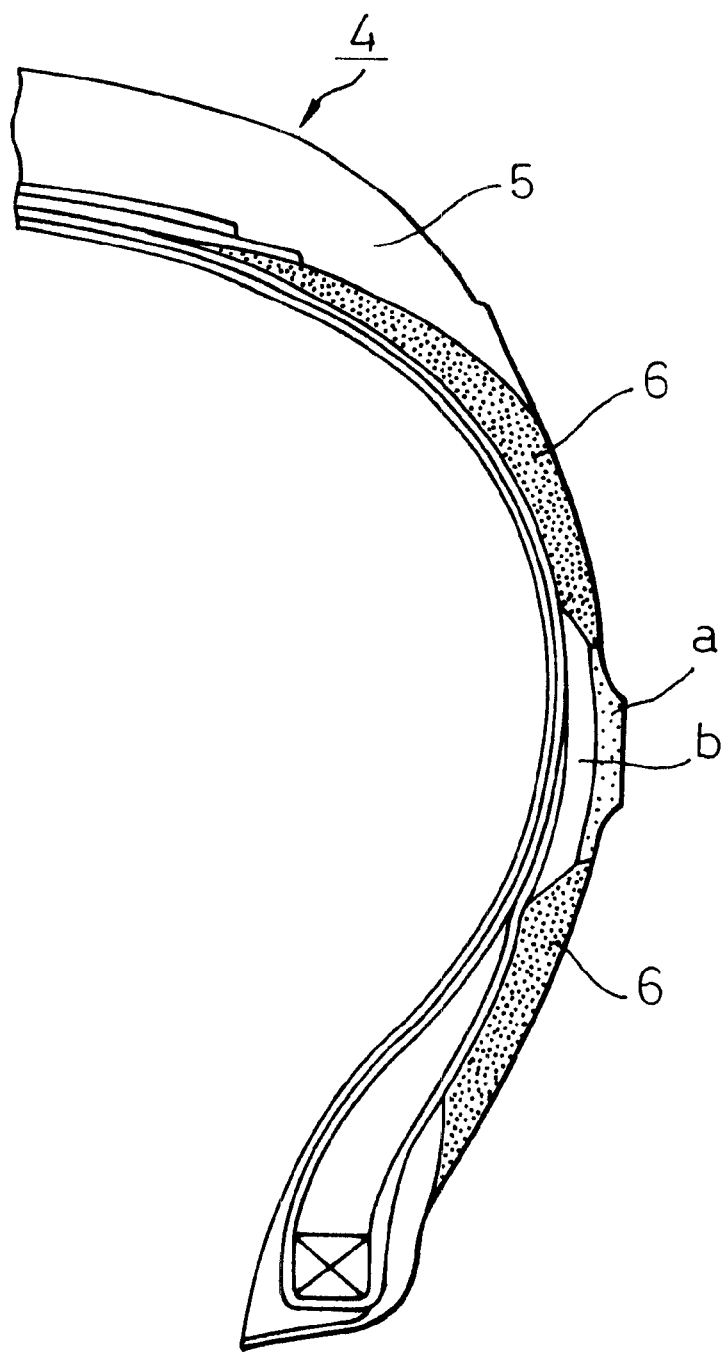
FIG. 2 is a partial sectional view in the meridian direction of a pneumatic tire according to the present invention wherein a two layer-structure of a phosphorescent rubber layer a and a reflecting layer b, or a cover layer a and a phosphorescent rubber layer b is provided at a side ribbon portion 4 thereof.
Figure 3:
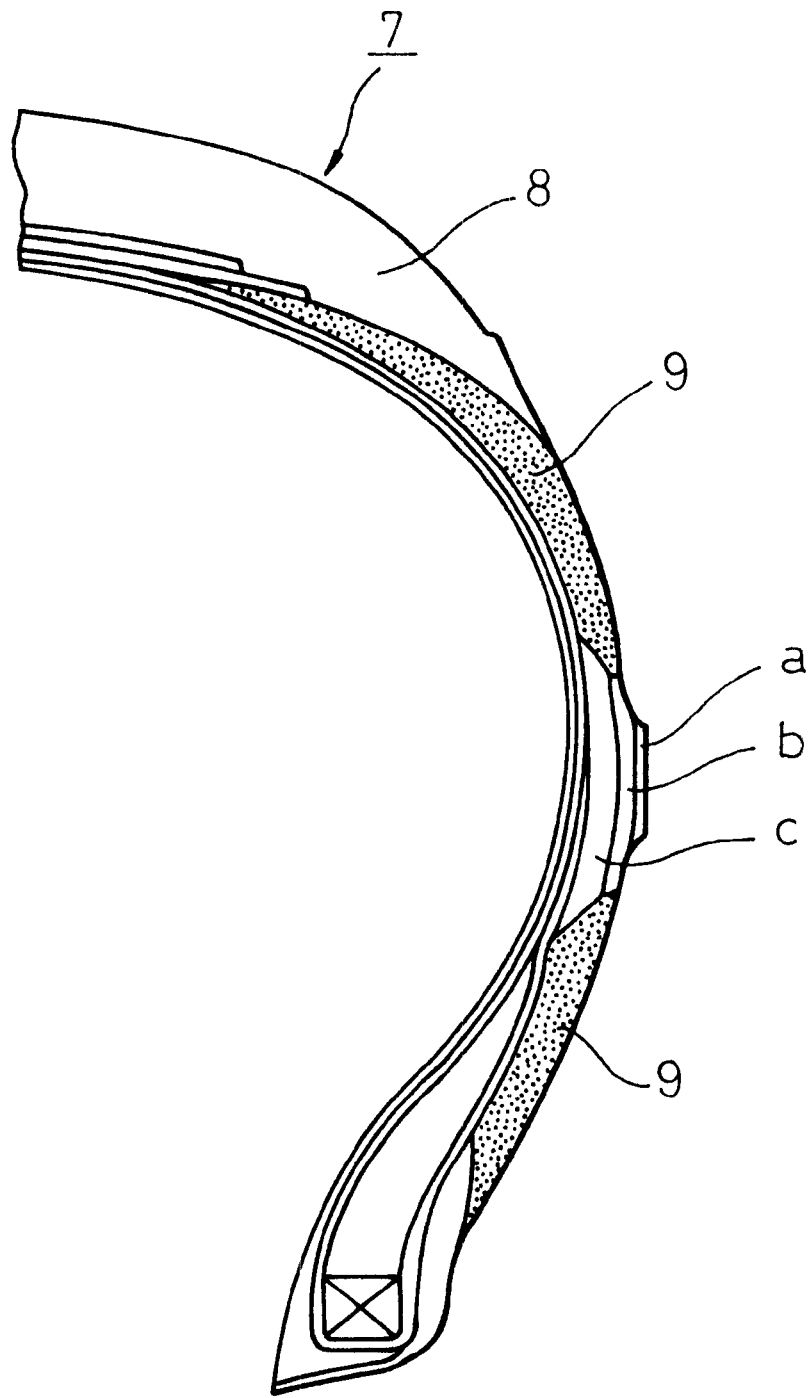
FIG. 3 is a partial sectional view in the meridian direction of a pneumatic tire according to the present invention wherein a three-layer structure of a cover layer a, a phosphorescent rubber layer b and a reflecting layer c thereof is provided at a side ribbon portion 7 thereof.

Each pneumatic tire having a side ribbon portion with a composition and a structure shown in Table 2 and FIGS. 1–3 and having a tire size of LT 225/75R16 is manufactured from the composition shown in Table 1 below according to a conventional method. The following cut-growth test, emission luminance test and weathering test were carried out as follows.

1) Cut-Growth Test 6 knife-flaws each have a length of 5 mm and a depth of 1.5 mm are cut in the white side wall portions of the tire in the circumferential direction and the tire was arranged in the rim having a size of 16×6 JJ. The growth length of the flaw was determined using a 1707 mm diameter steel drum testor having a smooth drum surface under the conditions of a controlled ambient temperature of 38±3° C., inner pressure of 140 kPa, load of 7.27 KN, speed of 80 km/hr and running distance of 5000 km.

The results are shown in Table 2 by an average growth length of the six flaws under the following criteria when indexed to the growth length of the standard tire as 100.

⊚: less than 80
○: more than 80 to 110
X: more than 110

The smaller the value, the better the result.

2) Emission Luminance Test

The test tire was placed in the floor of the dark room such that the white side wall faced upper and, from 1 mm the directly overhead of the surface of the side wall, the 200 Lux light of normal light sauce D65 according to JIS (i.e., Japanese Industrial Standards) Z 8720 was illuminated for 30 minutes and the luminance after 10 minutes therefrom was visually observed. The results are evaluated under the following criteria and shown in Table 2.

⊚: Very bright
○: Glow (or phosphorescence) can be clearly confirmed
Δ: Dark, but light can be confirmed
X: No glow (or phosphorescence) can be confirmed
–: No glow (or phosphorescence) emission 3) Weathering Test The test tire was exposed to the sun for 3 months outdoor and, then, the conditions of the discoloration in the surface of the white side wall and the crack formation were visually observed. The results thus obtained were compared with those stored for 3 months in the room and the results were determined under the following criteria and shown in Table 2.

⊚: No substantial discoloration and no cracks
○: Some discoloration but the change in the appearance acceptable and no cracks
X: Discoloration such that the appearance is impaired or formation of delicate cracks

TABLE 1

Compounding Amount Table of Each Non-Black Layer

| Compounding Component | 1 (phr) | 2 (phr) | 3 (phr) | 4 (phr) | 5 (phr) | 6 (phr) | 7 (phr) | 8 (phr) | 9 (phr) | 10 (phr) | 11 (phr) |
|---|---|---|---|---|---|---|---|---|---|---|---|
| Isoprene rubber | 50 | 50 | 50 | 50 | 50 | 40 | 50 | 50 | 30 | — | — |
| Ethylene propylene rubber | 20 | 20 | 20 | 20 | 20 | 20 | 20 | 20 | 50 | 80 | 50 |
| Brominated vinyl rubber | 30 | 30 | 30 | 30 | 30 | 40 | 30 | 30 | 20 | 20 | — |
| Polypropylene | — | — | — | — | — | — | — | — | — | — | 50 |
| Clay | 40 | — | — | — | — | — | — | — | — | — | — |
| Silica | — | 30 | 30 | 30 | 20 | 20 | 30 | 30 | 30 | 30 | — |
| Titanium oxide | 20 | — | — | — | — | — | 10 | 10 | — | — | — |
| Silane coupling agent | — | 2 | 2 | 2 | 2 | 2 | 2 | 2 | 2 | 2 | — |
| Zinc oxide | 5 | — | — | — | — | — | 5 | 5 | — | — | — |
| Stearic acid | 1 | 1 | 1 | 1 | 1 | 1 | 1 | 1 | — | — | — |
| Antioxidant | 1 | 1 | 1 | 1 | 1 | 1 | 1 | 1 | 0.5 | 0.5 | — |
| Zinc stearate | — | — | — | — | — | 2 | — | — | — | — | — |
| Insoluble sulfur | 2 | 2 | 2 | — | — | — | — | 2 | — | — | — |
| Hydrogenated terpen resin | — | — | — | — | — | — | — | — | — | 5 | 5 |
| Vulcanization accelerator | 1 | 1 | 1 | — | — | — | — | 1 | — | — | — |
| Peroxide 1 | — | — | — | 5 | 3 | 2 | 5 | — | — | — | — |
| Peroxide 2 | — | — | — | — | — | — | — | — | 2 | 2 | 1 |
| Quinon dioxime | — | — | — | — | — | 3 | — | — | — | — | — |

TABLE 1-continued

Compounding Amount Table of Each Non-Black Layer

| Compounding Component | Compounding No. | | | | | | | | | | |
|---|---|---|---|---|---|---|---|---|---|---|---|
| | 1 (phr) | 2 (phr) | 3 (phr) | 4 (phr) | 5 (phr) | 6 (phr) | 7 (phr) | 8 (phr) | 9 (phr) | 10 (phr) | 11 (phr) |
| ZnS:Cu | — | 30 | — | — | — | — | — | — | — | — | — |
| $SrAl_2O_4$:Eu, Dy | — | — | 30 | 30 | 30 | 30 | — | — | — | — | — |

Remarks of Table 1

Compound No. 1: Composition of white side rubber (Control)

Compound No. 2: Phosphorescent rubber composition containing conventional phosphorescent pigment (Control)

Compound No. 3: Phosphorescent rubber composition vulcanized with sulfur (Present Invention)

Compound No. 4: Phosphorescent rubber crosslinked with peroxide (Present Invention)

Compound No. 5: Phosphorescent rubber with low modulus compounding (Present Invention)

Compound No. 6: Phosphorescent rubber with high butyl compounding (Present Invention)

Compound No. 7: Reflecting layer composition crosslinked with peroxide

Compound No. 8: Reflecting layer composition vulcanized with sulfur

Compound No. 9: Transparent cover layer composition 1 (rubber, transmittance 43%)

Compound No. 10: Transparent cover layer composition 2 (rubber, transmittance 60%)

Compound No. 11: Transparent cover layer composition 3 (thermoplastic elastomer, transmittance 72%)

Standard Example 1. Examples 1–8 and Comparative Examples 1–3

In these Examples, the test results of tires having a side ribbon portion composed of non-black rubber with a single phosphorescent layer, a two-layer structure of a phosphorescent layer and a reflecting layer, a two-layer structure of a cover layer and a phosphorescent layer and a three-layer structure of a cover layer, a phosphorescent layer and a reflecting layer are shown in Table 2.

TABLE 2

(Test Tire Size: LT225/75R16)

| | Stand. Ex. 1 | Comp. Ex. 1 | Comp. Ex. 2 | Ex. 1 | Ex. 2 | Ex. 3 | Ex. 4 | Ex. 5 | Comp. Ex. 3 | Ex. 6 | Ex. 7 | Ex. 8 |
|---|---|---|---|---|---|---|---|---|---|---|---|---|
| Structure of Tire | | | | | | | | | | | | |
| Structure of Side Ribbon Portion | 1 layer | 1 layer | 1 layer | 1 layer | 2 layer | 2 layer | 2 layer | 2 layer | 2 layer | 2 layer | 2 layer | 3 layer |
| Reference Fig. | FIG. 1 | FIG. 1 | FIG. 1 | FIG. 1 | FIG. 2 | FIG. 2 | FIG. 2 | FIG. 2 | FIG. 2 | FIG. 2 | FIG. 2 | FIG. 3 |
| Side Ribbon Compounding | | | | | | | | | | | | |
| a | Compd. 1 | Compd. 2 | Compd. 3 | Compd. 4 | Compd. 4 | Compd. 5 | Compd. 4 | Compd. 6 | Compd. 9 | Compd. 10 | Compd. 11 | Compd. 10 |
| b | — | — | — | — | Compd. 7 | Compd. 7 | Compd. 8 | Compd. 7 | Compd. 4 | Compd. 4 | Compd. 4 | Compd. 4 |
| c | — | — | — | — | — | — | — | — | — | — | — | Compd. 7 |
| Thickness of Side Ribbon Portion after buffing or slicing in parenthesis | | | | | | | | | | | | |
| a (mm) | 6 (4) | 6 (4) | 6 (4) | 6 (4) | 3 (1) | 3 (1) | 3 (1) | 3 (1) | 3 (1) | 3 (1) | 3 (1) | 3 (1) |
| b (mm) | — | — | — | — | 3 | 3 | 3 | 3 | 3 | 3 | 3 | 1 |
| c (mm) | — | — | — | — | — | — | — | — | — | — | — | 2 |
| Total Thickness (mm) | 6 (4) | 6 (4) | 6 (4) | 6 (4) | 6 (4) | 6 (4) | 6 (4) | 6 (4) | 6 (4) | 6 (4) | 6 (4) | 6 (4) |
| Test Result | | | | | | | | | | | | |
| Cut-Growth Test (Pass-Fail) | ○ | ○ | ○ | ○ | ○ | ◎ | ○ | ◎ | ○ | ○ | ◎ | ○ |
| Emission Luminance Test (4 rank) | — | Δ | Δ | ○ | ◎ | ◎ | ◎ | ◎ | × | ○ | ○ | ◎ |
| Weathering Test (Pass-Fail) | ○ | ○ | ○ | ○ | ○ | ○ | ○ | ◎ | ◎ | ◎ | ◎ | ◎ |

As is clear from the results shown in Table 2, the tire of Example 1 using a single phosphorescent rubber layer containing the phosphorescent substance and crosslinked with the peroxide has an excellent emission luminance, when compared with that of Comparative Example 1 using a phosphorescent rubber layer containing the conventional phosphorescent substance and vulcanized with sulfur and also that of Comparative Example 2 using a phosphorescent rubber layer containing the phosphorescent substance according to the present invention but vulcanized with sulfer. As shown in the results of Examples 2–5, in which the ribbon portion was formed from the two-layer structure of the phosphorescent rubber layer according to the present invention and the reflecting layer, exhibit a more excellent emission luminance. Furthermore, the result of Example 5 using the phosphorescent rubber layer crosslinked with the crosslinking agent of quinondioxins and zinc stearate exhibits the formation of the tire having excellent anti-crack growth and weather resistance, in addition to the emission luminance.

Furthermore, those of Examples 6–8 having the cover layer on the upper side of the phosphorescent rubber layer according to the present invention are exhibit the excellent weather resistance, when compared with that of Example 1 having no cover layer. In addition, in the case of Comparative Example 3 using a cover layer having a light transmittance of less than 50%, the light is not sufficiently reached and the luminance is low, whereas in the case of Examples 6 and 7 using a cover layer having a light transmittance of more than 50%, the sufficient emission luminance and the excellent weather resistance can be obtained. In Example 7 using a thermoplastic elastomer having a light transmittance of 72% as a cover layer, the result of the crack growth is superior to those of Examples 6 and 8 using a rubber having a light transmittance of 60%. Furthermore, in Example 8 using a three-layer structure of the given cover layer, phosphorescent layer and reflecting layer, the emission luminance is further improved. When the non-black rubber of the present invention, in which the specified phosphorescent substance is used, no carbon black is compounded and non-sulfur crosslinking is carried out, is used as a part of a tire, the non-black rubber having excellent emission luminance, suppressed crack growth and excellent weather resistance can be obtained. When this non-black rubber is used in, for example, the side portion of tire, a tire having improved visibility and fashionability due to the emission of luminance during the running at night can be obtained. Furthermore, when the non-black rubber is formed by a two-layer structure of the transparent or translucent cover layer and the phosphorescent rubber layer and only the portion thereof is sliced, the thickness of the phosphorescent layer can be made thin, the amount of the phosphorescent substance to be used can be decreased and the weather resistance of the phosphorescent rubber layer can be increased due to the remaining cover layer.

Furthermore, when the non-black rubber is formed by the phosphorescent rubber layer and the reflecting layer. The emission luminance thereof can be further improved.

What is claimed is:

1. A pneumatic tire having a rubber composition provided at the at least one portion thereof, at least a portion of said rubber composition comprising 100 part by weight of at least one synthetic rubber and 5 to 100 parts by weight of strontium aluminate or calcium aluminate-containing long afterglow phosphorescent substance having at least one compound selected from the group consisting of (a) $SrAl_2O_4$:Eu, Dy, (b) $Sr_4Al_{14}O_{25}$:Eu, Dy, (c) $CaAl_2O_4$:Eu, Nd, (d) $SrAl_2O_4$:Eu and (e) $m(Sr_{1-x}EU_x)O \cdot nAL_2O_3 \cdot yB_2O_3$, wherein $1 \leq 1 \leq m \leq 5$, $1 \leq n \leq 8$, $0.001 \leq x \leq 0.1$, $0.005 \leq y \leq 0.35$, having an average particle size of 1 to 100 μm and having no substantial amounts of carbon black and staining antioxidant, and crosslinked with a crosslinking agent other than sulfur.

2. A pneumatic tire having at least two layer structures of (i) a surface layer composed of a long afterglow phosphorescent rubber composition layer (A) comprising 100 part by weight of at least one synthetic rubber and 5 to 100 parts by weight of strontium aluminate or calcium aluminate-containing long afterglow phosphorescent substance having an average particle size of 1 to 100 μm and having no substantial amounts of carbon black and staining antioxidants, and crosslinked with a crosslinking agent other than sulfur and (ii) a lower layer of a bright-colored reflecting rubber layer (B).

3. A pneumatic tire comprising (i) a light accumulating rubber composition layer (A) comprising a rubber provided at at least a portion thereof, at least a portion of the rubber being composed of 100 part by weight of at least one synthetic rubber and 5 to 100 parts by weight of strontium aluminate or calcium aluminate-containing long afterglow phosphorescent substance having at least one compound selected from the group consisting of (a) $SrAl_2O_4$:Eu, Dy, (b) $Sr_4Al_{14}O_{25}$:Eu, Dy, (c) $CaAl_2O_4$:Eu, Nd, (d) $SrAl_2O_4$:Eu and (e) $m(Sr_{1-x}EU_x)O \cdot nAL_2O_3 \cdot yB_2O_3$, wherein $1 \leq m \leq 5$, $1 \leq n \leq 8$, $0.001 \leq x \leq 0.1$, $0.005 \leq y \leq 0.35$, having an average particle size of 1 to 100 μm and having no substantial amounts of carbon black and staining antioxidants, and crosslinked with a crosslinking agent other than sulfur and (ii) a transparent or translucent cover layer (C) located in the outer surface side of the tire.

4. A pneumatic tire as claimed in claim 1, wherein said rubber is composed of the three layer of, in the order from the outer surface of the tire, a transparent or translucent cover layer (C), a long afterglow phosphorescent rubber composition layer (A) and a bright-colored reflecting rubber layer (B).

5. A pneumatic tire as claimed in claim 1, wherein at least the long afterglow phosphorescent rubber composition of said rubber contains an isobutylene rubber.

6. A pneumatic tire as claimed in claim 2, wherein at least the long afterglow phosphorescent rubber composition of said rubber contains an isobutylene rubber.

7. A pneumatic tire as claimed in claim 3, wherein at least the long afterglovw phosphorescent rubber composition of said rubber contains an isobutylene rubber.

8. A pneumatic tire as claimed in claim 4, wherein at least the long afterglow phosphorescent rubber composition of said rubber contains an isobutylene rubber.

9. A pneumatic tire as claimed in claim 3, wherein sail transparent or translucent cover layer (C) is composed of such a rubber composition, thermoplastic resin or thermoplastic elastomer that the light transmittance of 1 mm thick film is 50% or more.

10. A pneumatic tire as claimed in claim 4, wherein said transparent or translucent cover layer (C) is composed of such a rubber composition, thermoplastic resin or thermoplastic elastomer that the light transmittance of 1 mm thick film is 50% or more.

11. A pneumatic tire as claimed in any one of claims 3, 4, 9 or 10, wherein a part of the transparent or translucent cover layer (C) is removed after the vulcanization of the tire.

* * * * *